(12) United States Patent
Chang

(10) Patent No.: US 10,852,536 B2
(45) Date of Patent: Dec. 1, 2020

(54) SPI-BASED HEAD-UP DISPLAY BACKLIGHT CONTROL METHOD

(71) Applicant: Continental Automotive GmbH, Hannover (DE)

(72) Inventor: Xi Chang, Jiangning Econ. and Techn. Develop. Zone (CN)

(73) Assignee: Continental Automotive GmbH, Hannover (DE)

( * ) Notice: Subject to any disclaimer, the term of this patent is extended or adjusted under 35 U.S.C. 154(b) by 100 days.

(21) Appl. No.: 16/050,826

(22) Filed: Jul. 31, 2018

(65) Prior Publication Data

US 2018/0335625 A1    Nov. 22, 2018

Related U.S. Application Data

(63) Continuation of application No. PCT/IB2017/000078, filed on Feb. 6, 2017.

(30) Foreign Application Priority Data

Feb. 5, 2016 (CN) .......................... 2016 1 0080936

(51) Int. Cl.
*G02B 27/14* (2006.01)
*G09G 5/00* (2006.01)
(Continued)

(52) U.S. Cl.
CPC .......... *G02B 27/0101* (2013.01); *B60K 35/00* (2013.01); *G09G 3/3406* (2013.01);
(Continued)

(58) Field of Classification Search
CPC ........ G02B 27/0101; G02B 2027/0118; H05B 45/00; B60K 35/00; B60K 2370/1529;
(Continued)

(56) References Cited

U.S. PATENT DOCUMENTS 7,408,527 B2   8/2008 Slobodin
2007/0211014 A1   9/2007 Kim et al.
(Continued)

FOREIGN PATENT DOCUMENTS

CN   202093785 U   12/2011
CN   102788294 A   11/2012
(Continued)

OTHER PUBLICATIONS

International Search Report and Written Opinion dated May 29, 2017 from corresponding International Patent Application No. PCT/IB2017/000078.
(Continued)

*Primary Examiner* — William Choi

(57) ABSTRACT

An SPI-based HUD backlight control method places multiple backlight values obtained by calculation into a backlight setting command and transmits the same to an LED controller via an SPI bus. After obtaining the backlight setting command, the LED controller sequentially applies one backlight value in the backlight setting command each time a frame synchronization signal is obtained. The method reduces the SPI bus load, so that the smoothness of backlight variation is increased, thereby ameliorating display flicker.

5 Claims, 2 Drawing Sheets

(51) Int. Cl.
*G02B 27/01* (2006.01)
*G09G 3/34* (2006.01)
*B60K 35/00* (2006.01)
*G09G 5/10* (2006.01)
*H05B 45/00* (2020.01)
*H04N 5/04* (2006.01)

(52) U.S. Cl.
CPC ............. *G09G 5/10* (2013.01); *H04N 5/04* (2013.01); *H05B 45/00* (2020.01); *B60K 2370/1529* (2019.05); *B60K 2370/334* (2019.05); *G02B 2027/0118* (2013.01); *G09G 2320/0626* (2013.01); *G09G 2350/00* (2013.01); *G09G 2360/16* (2013.01); *G09G 2370/04* (2013.01); *G09G 2370/10* (2013.01); *G09G 2380/10* (2013.01)

(58) Field of Classification Search
CPC .. B60K 2370/334; G09G 3/3406; G09G 5/10; G09G 2320/0626; G09G 2350/00; G09G 2360/16; G09G 2370/04; G09G 2370/10; G09G 2380/10; H04N 5/04
USPC .......................................... 359/630; 345/7, 9
See application file for complete search history.

(56) References Cited

U.S. PATENT DOCUMENTS

| | | |
|---|---|---|
| 2011/0037790 A1 | 2/2011 | Onishi |
| 2014/0125640 A1 | 5/2014 | Jung et al. |
| 2017/0098400 A1 | 4/2017 | Yamakawa et al. |
| 2019/0080514 A1* | 3/2019 | Nasi .................... B64C 39/024 |

FOREIGN PATENT DOCUMENTS

| | | |
|---|---|---|
| CN | 102890917 A | 1/2013 |
| CN | 202855274 U | 4/2013 |
| CN | 103606356 A | 2/2014 |
| EP | 0570037 A1 | 11/1993 |
| JP | 2007241286 A | 9/2007 |
| JP | 2007535709 A | 12/2007 |
| JP | 2010098020 A | 4/2010 |
| JP | 2013088526 A | 5/2013 |
| JP | 2015133251 A | 7/2015 |
| JP | 2016004121 A | 1/2016 |
| JP | 2016006496 A | 1/2016 |
| KR | 20150079004 A | 7/2015 |

OTHER PUBLICATIONS

Japanese Decision to Grant a Patent dated Jul. 19, 2020 for the counterpart Japanese Patent Application No. 2018-540747.

* cited by examiner

SPI-BASED HEAD-UP DISPLAY BACKLIGHT CONTROL METHOD

TECHNICAL FIELD

The present invention relates to the field of control of Head-Up Displays, in particular to a Serial Peripheral Interface or "SPI"-based Head-Up Display (HUD) backlight control method.

BACKGROUND

A Head-Up Display (HUD) enables a driver to view certain necessary information while traveling without lowering his head, and therefore helps to increase travel safety and make the acquisition of information more convenient.

At present, solutions capable of enhancing the performance of HUDs are also being researched and developed further in the industry. An example is the Digital Light Processing (DLP) chipset, designed specifically for vehicle-mounted head-up display applications, that has been released by Texas Instruments (TI). The chipset consists principally of a Digital Micro-mirror Device (DMD) and a corresponding DLP controller. In the case of the DLP head-up display application, LED backlight control associated with display is generally completed by two controllers working in coordination with each other. One is a light-emitting diode (LED) controller, mainly responsible for controlling the colour and brightness of the LED backlight; another is a motor vehicle controller, which mainly outputs a backlight value to be set according to a given light adjustment algorithm, based on the inputs of environmental parameters (environmental light, etc.) and user parameters (backlight brightness level). The backlight value is sent to the LED controller via an SPI bus, and the LED controller subjects a red LED, a green LED and a blue LED to corresponding control. Since the video source signal frequency is 60 Hz at present, a 60 Hz frame synchronization signal is fed into the LED controller by the DLP controller. When the frame synchronization signal arrives, the LED controller can apply a backlight value, which is transmitted from the motor vehicle controller by means of an SPI command. To ensure that the frequency at which the LED controller updates the backlight value reaches an effective 60 Hz, the frequency at which the motor vehicle controller transmits backlight values is required to be 60 Hz, i.e. one backlight value transmitted every 16.67 ms. An existing solution for this requirement is as follows: the motor vehicle controller places backlight setting commands and other SPI commands in an SPI queue, then transmits the commands in the queue one after another, based on a given transmission period.

In the solution just described, when it is necessary to transmit a backlight setting command, it is possible that the SPI bus is currently occupied by another SPI command, and it is necessary to wait until transmission of that command is complete, and corresponding feedback that function execution is complete has been obtained, before releasing the SPI bus; only then can the SPI bus resources be used for transmitting a backlight setting command. Thus, it is very difficult to ensure that backlight setting commands are transmitted once every 16 or 17 ms, and the result is that changes in the backlight are not smooth enough, so that the display flickers.

SUMMARY OF THE INVENTION

The problem solved by the present invention is to provide an SPI-based HUD backlight control method, to ameliorate display flicker.

To solve this problem, in the SPI-based HUD backlight control method of the present invention, the HUD comprises: a motor vehicle controller, an LED device providing backlight for display and a controller thereof, wherein the motor vehicle controller transmits a backlight setting command to the LED controller in order to perform backlight control, characterized in that the method comprises:

the motor vehicle controller using a frequency of a video source signal of the HUD as a backlight value calculation frequency, and calculating backlight values at this frequency;

the motor vehicle controller placing multiple backlight values obtained by calculation into a backlight setting command, and transmitting same to the LED controller via an SPI bus;

after obtaining the backlight setting command, the LED controller sequentially applying one backlight value in the backlight setting command each time a frame synchronization signal is obtained.

Compared with the prior art, the solution described above has the following advantages: the backlight setting command transmission period is extended by placing multiple backlight values into one backlight setting command. On the one hand, the SPI bus load is reduced, because the extension of the transmission period reduces the requirement on backlight setting command transmission time. On the other hand, the extension of the transmission period also results in the times when the LED controller receives each backlight setting command and applies the backlight values therein more evenly spread out, so that the smoothness of backlight variation is increased, thereby ameliorating display flicker.

DETAILED DESCRIPTION

In the following description, many specific details are expounded in order to give those skilled in the art a more comprehensive understanding of the present invention. However, it will be obvious to those skilled in the art that the implementation of the present invention may omit some of these specific details. Furthermore, it should be understood that the present invention is not limited to the specific embodiments presented. On the contrary, the use of any combination of the features and key elements below to implement the present invention may be considered, regardless of whether they relate to different embodiments. Furthermore, the aspects, features, embodiments and advantages below are merely explanatory, and should not be regarded as key elements or definitions of the claims, unless clearly stated in the claims.

Figure 1:
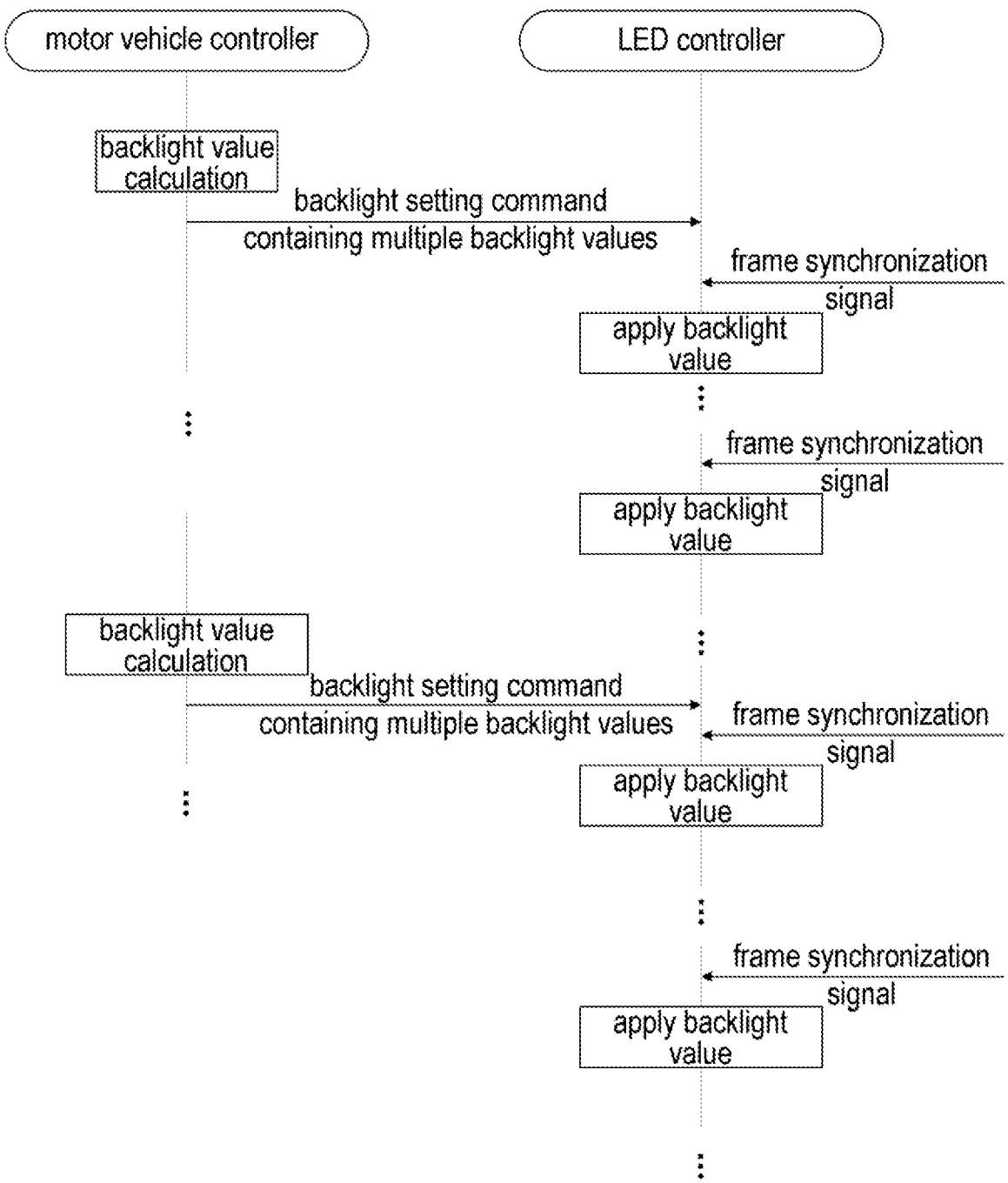
FIG. 1 is a schematic diagram of an embodiment of the SPI-based HUD backlight control method of the present invention.

As FIG. 1 shows, according to one embodiment of the present invention, the motor vehicle controller 102, after obtaining an environmental parameter (e.g. environmental light) and a user parameter (e.g. backlight brightness level), calculates backlight values 104 according to these inputs. To enable the subsequently transmitted backlight values, when applied by the LED controller in the HUD, to be in synchrony with a video source signal of the HUD, the frequency of the video source signal should be used as the frequency of backlight value calculation. For example, if the video source signal is 60 Hz, the frequency of backlight value calculation should also be matched to this, i.e. one backlight value is calculated every 16.67 ms. When multiple backlight values have been obtained by multiple backlight value calculations, the motor vehicle controller transmits a backlight setting command containing multiple backlight values 106 to the LED controller 108 via a communication connection 110 with the LED controller 108. In a backlight setting command, each backlight value is arranged in order according to the sequence of calculation.

Having received the backlight setting command, the LED controller 108 will first of all apply a first backlight value after receiving a frame synchronization signal 112, then apply a second backlight value 114 after receiving another frame synchronization signal 116, and so on, until all of the multiple backlight values in the backlight setting command have been applied 118. Then, after receiving another backlight setting command 120, the LED controller still operates in the manner described above (sequentially applying one backlight value in the backlight setting command each time a frame synchronization signal is obtained). It can be seen therefrom that in an embodiment of the present invention, the LED controller 108 already has an available backlight value 104 when receiving a frame synchronization signal 122. Therefore, each time backlight control is performed, 124, 126 . . . , based on a backlight value 104, the frequency of the video source signal can be matched, to achieve smoother backlight variation.

Figure 2:
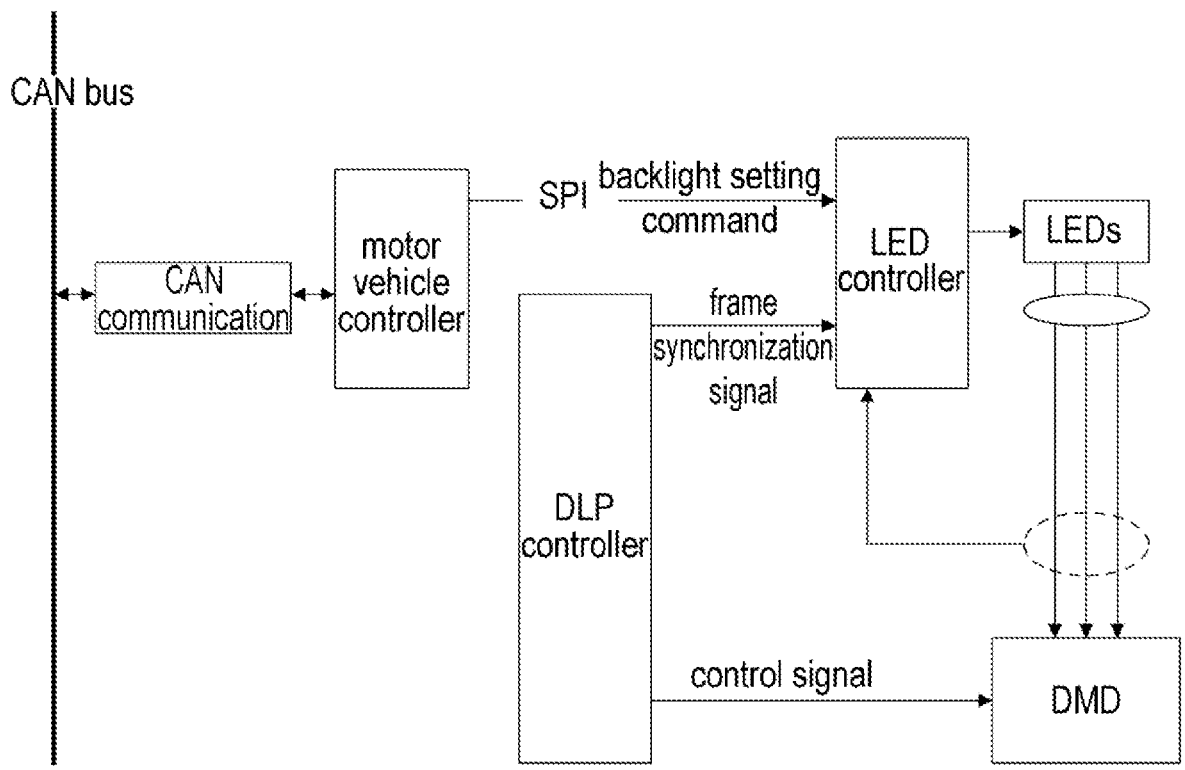
FIG. 2 is a schematic diagram of an embodiment of HUD backlight control using the method of the present invention.

FIG. 2 provides a simplified view of an application structure of the method of the present invention in a vehicle-mounted HUD. Specifically, the chipset which controls the vehicle-mounted HUD may be a DLP chipset from TI. Referring to FIG. 2, the DLP chipset used in this example comprises: a DLP controller 202, a DMD 204 controlled by the DLP controller 202, a Piccolo MCU LED controller 206, and a red/green/blue tri-colour LED 208 controlled by the LED controller 206. Through control of the colour and brightness of LED backlight by the LED controller 206 and control of the DMD 204 by the DLP controller 202, content to be displayed is finally projected onto the vehicle windscreen or other display interface for head-up display.

In this example, the motor vehicle controller 210 works in coordination with the LED controller 206, being connected to the LED controller 206 via an SPI bus 212, to transmit backlight setting commands 214 to the LED controller 206. Furthermore, the motor vehicle controller 210 obtains CAN messages from a CAN bus 218 via a CAN communication module 216. For example, when environmental parameters and/or user parameters come from other motor vehicle sub-systems (e.g. environmental temperature is obtained from an instrument), the motor vehicle controller 210 can obtain these parameters by means of CAN messages. The basic process of calculating backlight values and transmitting backlight setting commands by the motor vehicle controller is as explained above, but is explained further below in conjunction with a specific video source signal example.

Figure 3:
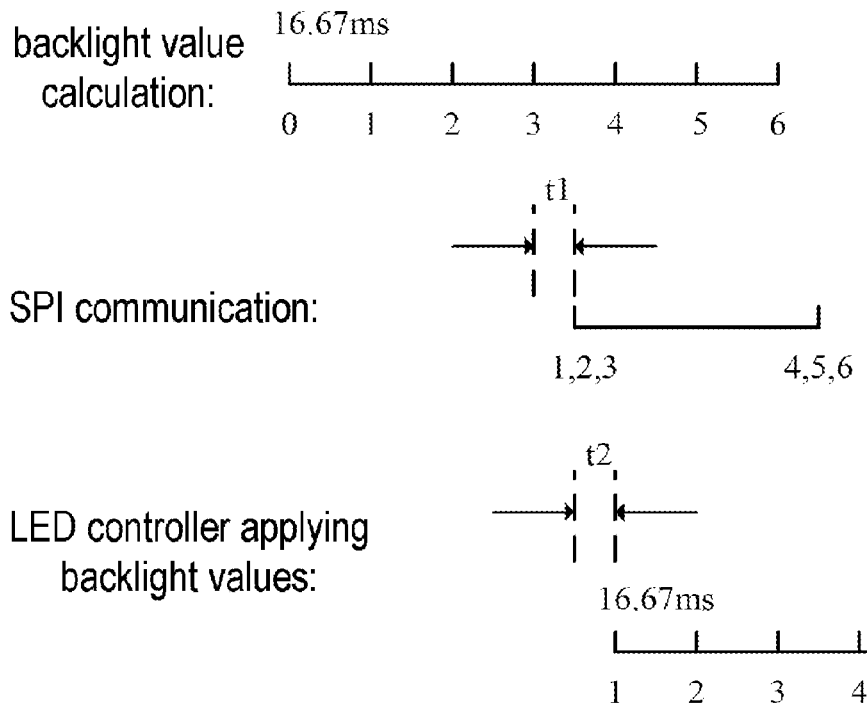
FIG. 3 is a schematic diagram showing the relationships among signals in an embodiment of the method according to the present invention.

Referring to FIG. 3, taking as an example the case of a video source signal of 60 Hz, which is relatively common at the present time, the motor vehicle controller calculates a backlight value once every 16.67 ms. After calculating three backlight values, the motor vehicle controller transmits the three backlight values obtained by calculation to the LED controller by means of a backlight setting command. Taking into consideration a real situation, there will be a time delay t1 between the time when the motor vehicle controller completes calculation of the three backlight values, and the SPI communication when the backlight setting command is transmitted. After calculating another three backlight values, the motor vehicle controller again transmits the three backlight values obtained by calculation to the LED controller by means of the next backlight setting command. Extending this principle, the motor vehicle controller transmits a backlight setting command to the LED controller every 50 ms.

After receiving the backlight setting command, the LED controller first of all sequentially stores the backlight value data in its own backlight setting queue, and awaits a frame synchronization signal from the DLP controller. Taking into consideration a real situation, there will also be a time delay t2 between the time when the LED controller receives the three backlight values in the backlight setting command, and the time when they begin to be applied after the frame synchronization signal is received. After receiving a frame synchronization signal, the LED controller will apply a backlight value. Since the frame synchronization signal frequency is also 60 Hz, the final backlight update frequency will also be 60 Hz, as long as the motor vehicle controller can ensure that a backlight setting command is transmitted to the LED controller every 50 ms. Thus, not only can the backlight update frequency match the video source signal, but also the motor vehicle controller now has more time for command transmission, so the difficulty of realizing smooth light adjustment is reduced. From a different perspective, the extension of the backlight setting command transmission period leaves time for other SPI commands, so that the success rate of transmission of other SPI commands is also increased.

It must be explained that the frequency at which the motor vehicle controller calculates backlight values and transmits backlight setting commands is not necessarily limited to calculating three times and transmitting once; it could also be calculating six times and transmitting once, i.e. the motor vehicle controller transmits one backlight setting command containing six backlight values to the LED controller every 100 ms. If the effect of the time delay is able to meet requirements, the transmission of one backlight setting command containing twelve backlight values every 200 ms could also be considered. Therefore, the number of backlight values finally calculated before transmitting a backlight setting command must be determined according to actual circumstances.

Since the video source signal in this example is 60 Hz, when the video source signal frequency changes, corresponding calculation and adjustment may also be made according to the explanation above.

Although the present invention has been disclosed above by way of preferred embodiments, the present invention is not limited thereto. Changes and amendments of all kinds made within the spirit and scope of the present invention by any person skilled in the art shall be included in the scope of protection of the present invention. Thus the scope of protection of the present invention shall be the scope defined by the claims.

The invention claimed is:

1. An SPI-based Head-Up Display (HUD) backlight control method for a HUD comprising a motor vehicle controller, an LED device providing backlight for display and a controller thereof, wherein the motor vehicle controller transmits a backlight setting command to the LED controller in order to perform backlight control, the method comprising:

a frequency of a video source signal of the HUD as a backlight value calculation frequency, and calculating backlight values at this frequency;

placing multiple backlight values obtained by calculation into a backlight setting command, and transmitting same to the LED controller via an SPI bus;

after obtaining the backlight setting command, the LED controller sequentially applying one backlight value in the backlight setting command each time a frame synchronization signal is obtained.

2. The SPI-based HUD backlight control method as claimed in claim 1, wherein the frequency at which the backlight setting commands are transmitted, is proportional to the number of backlight values.

3. The SPI-based HUD backlight control method as claimed in claim 1, wherein the motor vehicle controller puts 3, 6 and 12 backlight values into one backlight setting command.

4. The SPI-based HUD backlight control method as claimed in claim 1, wherein the frequency of the video source signal is 60 Hz and the frequency of the frame synchronization signal is 60 Hz.

5. The SPI-based HUD backlight control method as claimed in claim 1, wherein the HUD also comprises: a digital light processing controller and wherein the frame synchronization signal is transmitted to the LED controller by the digital light processing controller.

* * * * *